United States Patent [19]
Henderson et al.

[11] Patent Number: 5,530,447
[45] Date of Patent: Jun. 25, 1996

[54] BLIND-ZONE TARGET DISCRIMINATION METHOD AND SYSTEM FOR ROAD VEHICLE RADAR

[75] Inventors: Mark F. Henderson, Kokomo, Ind.; John C. Reed, Tucson, Ariz.; Phillip A. May, Lompoc, Calif.; Zhaohong Zhang, Kokomo, Ind.

[73] Assignee: Delco Electronics Corp., Kokomo, Ind.

[21] Appl. No.: 372,259

[22] Filed: Jan. 13, 1995

[51] Int. Cl.$^6$ ............................................. G01S 13/52
[52] U.S. Cl. ........................... 342/70; 340/904; 340/936
[58] Field of Search ................. 342/70, 71, 72; 340/904, 905, 936, 943, 933, 441, 466

[56] References Cited

U.S. PATENT DOCUMENTS

| | | | |
|---|---|---|---|
| 4,072,945 | 2/1978 | Katsumata et al. | 342/70 |
| 4,097,864 | 6/1978 | Endo et al. | 342/71 |
| 5,325,097 | 6/1994 | Zhang et al. | 342/71 |
| 5,339,075 | 8/1994 | Abgt et al. | 340/904 |

FOREIGN PATENT DOCUMENTS

| | | | |
|---|---|---|---|
| 2107741 | 9/1971 | Germany | 342/72 |
| 2655847 | 6/1977 | Germany | 342/71 |
| 2073533 | 10/1981 | United Kingdom | 342/70 |

*Primary Examiner*—Stephen M. Johnson
*Attorney, Agent, or Firm*—Mark A. Navarre

[57] ABSTRACT

A method and system for discriminating a target which presents a hazard to a motor vehicle moving in a first lane of traffic from a target moving in a second adjacent lane of traffic which does not present a hazard to the vehicle. The method includes the steps of utilizing an antenna mounted flush to a side of the vehicle to produce a radar beam having a beamwidth greater than 5–10 degrees to illuminate the target. At least a portion of the radar beam is produced along a first axis which is perpendicular to the direction of motion of the vehicle. The reflected signal is received from the illuminated target and a velocity of the illuminated target is estimated with a Kalman filter relative to the velocity of the vehicle in the direction of a second axis which is parallel to the direction of motion of the vehicle based on the reflected signal. The method also includes the steps of measuring the velocity of the vehicle using at least one velocity sensor and determining that the illuminated target is hazardous if the sum of the measured vehicle velocity and the estimated parallel target velocity is greater than a predetermined threshold. The illuminated target is determined not to be hazardous if the sum of the measured vehicle velocity and the estimated parallel target velocity is less than a predetermined threshold.

18 Claims, 4 Drawing Sheets

BLIND-ZONE TARGET DISCRIMINATION METHOD AND SYSTEM FOR ROAD VEHICLE RADAR

TECHNICAL FIELD

This invention is related to radar methods and systems for automotive hazard detection. More particularly, this invention relates to improvements in discrimination of bona fide hazard targets from various non-hazard targets and/or clutter commonly encountered in the typical automotive operating environment.

BACKGROUND ART

Many attempts at providing reliable hazard target discrimination have been carried out in the field of vehicular radar systems which provide target range and relative velocity measurements thereof. The operating environment of an automotive radar system presents many challenges to the system designer, among the most troublesome being differentiation between hazard and non-hazard targets, both of which return transmitted radar signals. Typical non-hazard targets include road signs, bridges, fences, guard rails and road-side burms, etc. Poor discrimination of such non-hazards from hazards of course limits the effectiveness and reliability of automotive radar systems.

Various attempts in the art have been made to remedy these radar system shortfalls. One such example of these attempts includes limiting the range and pattern width of signal transmission and reception which, in turn, also undesirably limits the area of detection. This is an especially unattractive option where, as in a vehicle blind-zone detection radar system, a relatively wide area needs to be covered. Other proposals for solving these radar system short-falls includes multiple transmitter and/or receiver configurations which, of course, add complexity and cost.

Variable transmitted radar pattern angle and range, interactive in response to steering input, have also been proposed to limit return signals from non-hazard targets such as chose which are tangential to a vehicle's travel around a curve or bend. This technique may be useful for look-ahead or look-back radar systems where radar pattern is substantially aligned with the major axis of the vehicle but does not address the problems of blind-zone radar systems where the transmission pattern is intentionally at an angle from the major axis of the vehicle.

In addition, radar system have been proposed which use relatively complicated methods such as return signal processing to separate multipath signals in frequency bands or which consider a combination of range and a target's radial velocity with respect to the vehicle.

A further prior art system uses a side mirror mounted look-back radar system to determine the relative velocity of a target in an adjacent lane. This system requires a narrow beamwidth of ≈5° for proper coverage, which is difficult to achieve at low cost.

SUMMARY OF THE INVENTION

It is thus an object of the present invention to provide a side zone vehicle radar method and system which are capable of separating various objects in proximity to the vehicle into two classes: hazardous targets and non-hazardous targets.

A further object of the present invention is to provide a side zone vehicle radar method and system which warn the operator of the vehicle when a hazardous target is present in any of the detection zones of the radar and does not alarm the driver when non-hazardous targets are present in the detection zone to the radar.

It is an additional object of the present invention to provide a method and system for discriminating between hazardous and non-hazardous targets in a vehicle radar system which is independent of the speed of the vehicle and substantially independent of the speed of a target vehicle.

It is also an object of the present invention to provide a method and system capable of detecting the presence of one or more targets in proximity to a vehicle moving in a first lane of traffic, such that a target which presents a potential hazard to the vehicle is discriminated from a target which does not present a hazard to the vehicle.

In carrying out the above objects and other objects of the present invention, in a road vehicle radar system that is capable of detecting the presence of one or more targets in proximity to a vehicle moving at a velocity in a first lane of traffic, a method is provided for discriminating a target which presents a hazard to the vehicle from a target which does not present a hazard to the vehicle. The method includes the step of producing a radar beam having a sufficient beamwidth to illuminate a target in a second lane which is adjacent to the first lane. At least a portion of the radar beam is produced along a first axis which is perpendicular to the direction of motion of the vehicle. A reflected signal is received from an illuminated target. A velocity is estimated of the illuminated target, relative to the velocity of the vehicle, in the direction of a second axis which is parallel to the direction of motion of the vehicle based on the reflected signal. The velocity of the vehicle is measured using at least one velocity sensor. Further, the method includes the steps of determining that the illuminated target is hazardous if the sum of the measured vehicle velocity and the estimated parallel target velocity is greater than a predetermined threshold, and determining that the illuminated target is not hazardous if the sum of the measured vehicle velocity and the estimated parallel target velocity is less than a predetermined threshold.

Further in carrying out the above objects and other objects of the present invention, a road vehicle radar system is provided for detecting the presence of one or more targets in proximity to a vehicle moving at a velocity in a first lane of traffic, and for discriminating a target which presents a hazard to the vehicle from a target which does not present a hazard to the vehicle. The system includes a radar signal generator and an antenna, coupled to the radar signal generator, for producing a radar beam having a sufficient beamwidth to illuminate a target in a second lane which is adjacent to the first lane. At least a portion of the radar beam is produced along a first axis which is perpendicular to the direction of motion of the vehicle. A receiver is coupled to the antenna for receiving a reflected signal from an illuminated target. Means are provided for estimating the velocity of the illuminated target in the direction of a second axis which is parallel to the direction of motion of the vehicle based on the reflected signal. A sensor is provided for measuring the velocity of the vehicle. A comparator is coupled to the estimating means and the sensor for determining that the illuminated target is hazardous if the sum of the measured vehicle velocity and the estimated parallel target velocity is greater than a predetermined threshold and for determining that the illuminated target is not hazardous if the sum of the measured vehicle velocity and the estimated parallel target velocity is less than a predetermined threshold.

The above objects and other objects, features, and advantages of the present invention are readily apparent from the following detailed description of the best mode for carrying out the invention when taken in connection with the accompanying drawings.

DETAILED DESCRIPTION OF THE INVENTION

Figure 1:
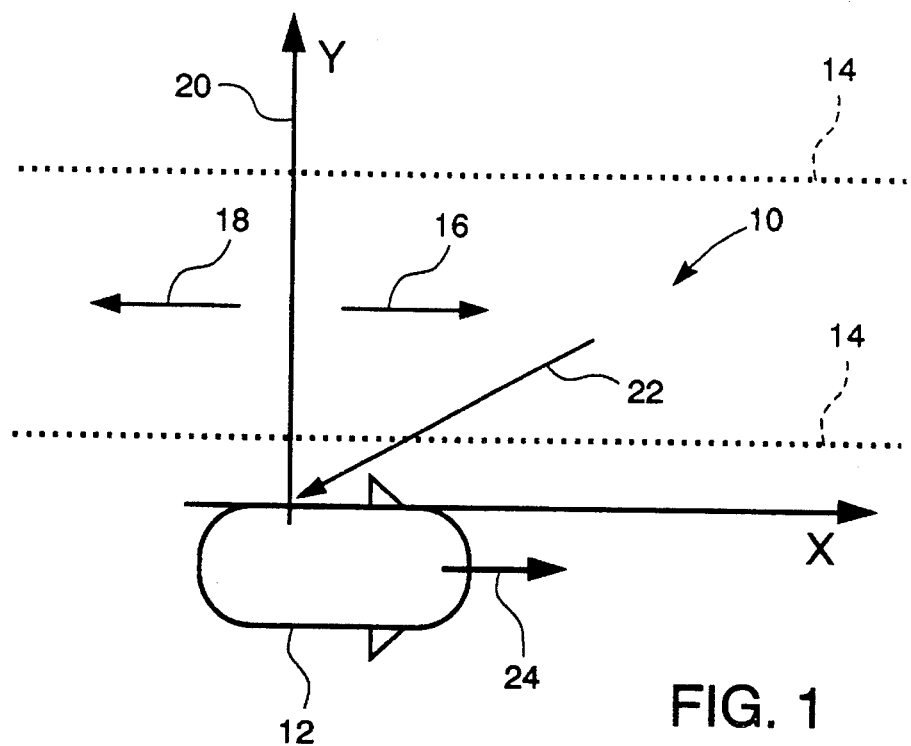
FIG. 1 is a schematic view of a side zone car (i.e. radar vehicle) and an adjacent lane of traffic defined by dotted lines.

The side zone automotive radar is capable of indicating whether or not there is the presence of a hazardous object (target) in the adjacent lane of the radar vehicle by using a microwave sensor of a certain type, antenna subsystem of a certain performance, and signal processing of certain performance (all defined below). The side zone radar can detect, observe, and classify (as to hazardous or non-hazardous) objects in the platform adjacent lane within 1/10 seconds after the objects come within the detection zones of the system. The adjacent lane 10 of a vehicle 12 is shown in FIG. 1 as the area between the dotted lines 14, which represent lane markers. Forward and rear zones of coverage 16 and 18, respectively, are separated by a line 20 at a radar location 22 on the vehicle 12. The line 20 (shown by "Y" axis) extends perpendicular to vehicle motion indicated by arrow 24 (along "X" axis).

Target Discrimination

Figure 2:
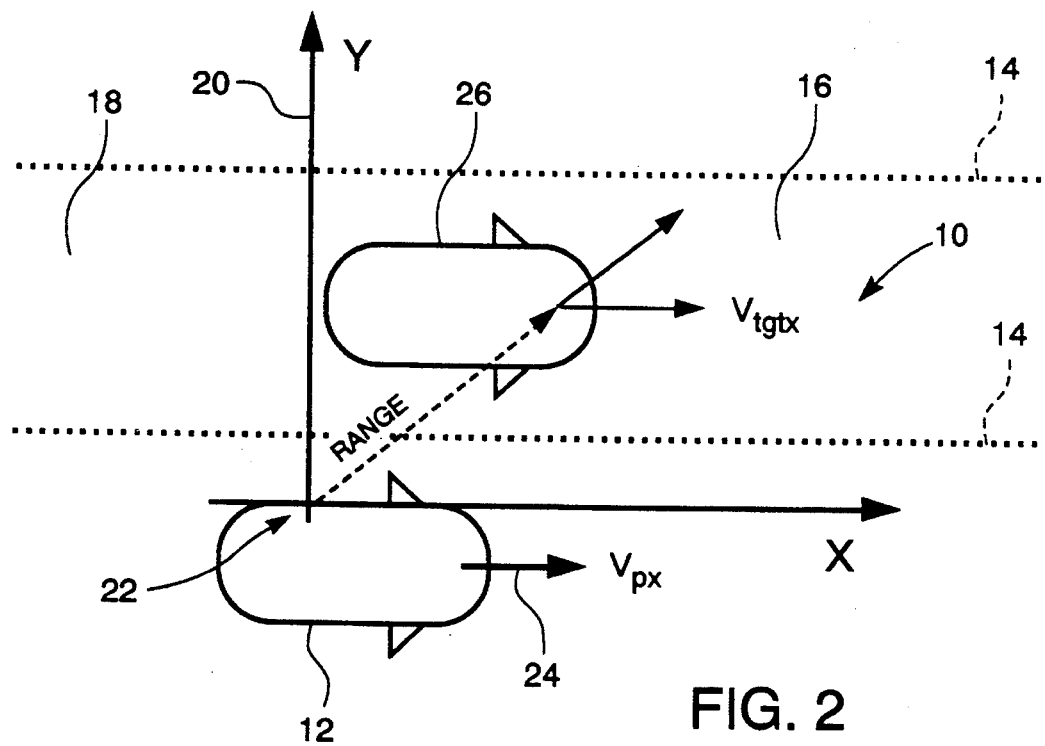
FIG. 2 is a schematic view similar to FIG. 1 including a target car in the adjacent lane.

The radar is able to separate various objects within the zones of coverage into two classes: hazardous targets and non-hazardous targets. The radar warns the operator of the radar vehicle 12 (i.e. "alarms the driver") when a hazardous target is present in any of the detection zones of the radar, and does not alarm the driver when the non-hazardous targets are present in the detection zones of the radar. This discrimination is independent of the speed of the radar vehicle 12, and substantially independent of the speed of a target vehicle 26, as illustrated in FIG. 2. As stated above, classification of targets is highly dependent on the direction of target motion relative to the direction of the radar vehicle 12.

The capability to discriminate between the two classes of targets eliminates numerous nuisance alarms which would be given by a system without discrimination. The reflected signals from both hazardous and non-hazardous targets (which result from the radar illuminating the targets) are similar in magnitude, in doppler frequency shift, and in range (distance to the target). Because of these similarities, reflected signal analysis specifically designed to classify the targets is necessary in order to both detect and alarm on hazardous targets, and not alarm on non-hazardous targets.

The elimination of alarms in the presence of non-hazardous targets greatly enhances the usefulness of a side detection system. Without discrimination, all objects in the radar detection zones cause an alarm, and the radar vehicle driver is left to discriminate between hazardous and non-hazardous targets. Since the presence of non-hazardous targets in the radar detection zones is a very common occurrence, the lack of discrimination then creates a high frequency of alarms as normal vehicle operation scenarios are encountered, even though most of the alarms do not indicate a hazardous situation.

With the feature of discrimination, a lower frequency of alarms is encountered as compared to a system without the discrimination function. The driver of the radar vehicle 12 is relieved of the discrimination task. The discriminated alarms then take on a higher importance to the radar vehicle driver since they occur only in potentially hazardous situations.

Mounting Configuration

The radar may be mounted in a completely flush configuration into the side of the vehicle 12 at 22 providing an unobtrusive low cost installation. The design is such that there need be no overhang, jut, or protrusion in the smooth exterior surface of the vehicle 12 to install the radar. The radar will work within installations which do impose a protrusion to the exterior surface of the vehicle 12 with no difference in performance with respect to a flush mount installation. The radar may be mounted anywhere on the side of the vehicle 12 such that the unit is between 18" and 36" above the road.

Mounting Location/Coverage Area

The radar may be configured to cover areas 10 forward and/or rear of the mounting location of the radar, depending on the needs of a particular application. Forward areas are those areas 16 alongside the vehicle 12 (in its adjacent lane) which are between the radar mounting location and the front of the vehicle 12. Rear areas 18 are those to the side of the vehicle 12 which are between the radar mounting location and the rear of the vehicle 12 as illustrated in FIG. 1.

The radar is capable of providing coverage zones which occupy 180° of (azimuth) angle with respect to its mounting location.

The side zone automotive radar accomplishes target discrimination by using velocity estimator signal processing (32 in FIG. 4) in conjunction with low resolution antennas (28 in FIG. 4) to estimate the target velocity in the "x" direction relative to the radar. This invention supplants high resolution antennas and relatively simple signal processing with low resolution antennas (28 in FIG. 4) and more complicated signal processing to achieve cost savings while still being able to estimate target position and velocity trajectories. This invention provides significant cost savings over other radar concepts primarily by eliminating the need for high azimuth resolution scanning antennas.

The target x-velocity estimate is computed by analyzing a sequence of range and range-rate (doppler) measurements collected over a time of less than 1/10 seconds, provided by a sensor (28 in FIG. 4) in the system.

The computed target x-directed velocity $V_{tgtx}$ is relative to the radar x-directed velocity $V_{px}$. Thus, the target x-directed velocity relative to the ground is computed in the radar by adding $V_{tgtx}$ and $V_{px}$. Once this is done, classification of the target into hazardous or non-hazardous categories is done according to the criteria set forth above. If the sum $V_{px}+V_{tgtx}$ is greater than zero, the target is classified as hazardous. Oncoming traffic targets will have a $V_{tgtx}$ such that the sum $V_{tgtx}+V_{px}$ is less than zero, and that stationary targets (with respect to the ground) will have $V_{tgtx}=-V_{px}$ resulting in the sum $V_{tgtx}+V_{px}$ equaling zero.

The platform velocity is known to the radar by means of accessing platform speed information commonly available in electronic form on most recent model year cars and trucks. By using the low resolution antennas 28 in concert with special signal processing, a low cost method of estimating target x-velocity is achieved.

Figure 4:
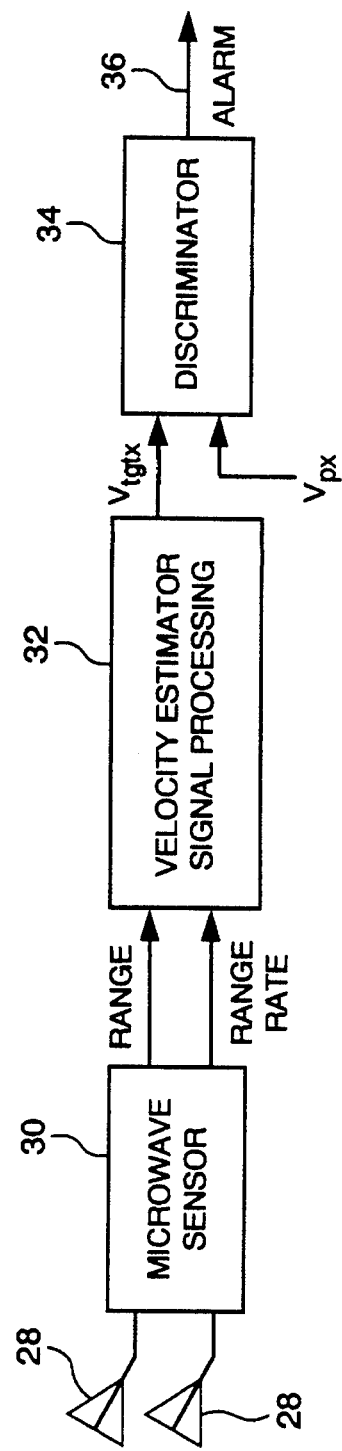
FIG. 4 is a schematic block diagram of the system of the present invention.

A system block diagram is shown in FIG. 4. The low resolution antennas 28 are coupled to the microwave sensor 30 which, in turn, provides the range and range rate information to a velocity estimator signal processing block 32. A discriminator 34 processes the velocity information, $V_{tgtx}$ from block 32 and the velocity information, $V_{px}$ to obtain an alarm signal on line 36. In other words, the sensor 30 using the low resolution antennas 28, collects and reports target range and range data to the "Velocity Estimator" 32. This signal processing analyses the historical range and range rate information to compute the target x-directed velocity. This target velocity is compared to the platform (radar car) speed in the discriminator 34 which makes the alarm decision.

The various components of the side zone system are described below.

Low Resolution Antennas (Crude Azimuth Resolution)

The side zone automotive radar is different from conventional radars in that it does not require high resolution azimuth information from its sensor 30 in order to estimate a particular component of the target velocity (in this case the "x" component). The side zone radar requires the detection zones to be split into at least four sectors via different radiation/receive channels or antenna beam steering in the microwave sensor in order for the system to provide a full 180° of azimuth coverage. No one sector may transverse the line perpendicular to the radar vehicle motion at the radar location ("zero doppler line"), which is shown as the "y" axis in FIG. 1. The separation of the detection area into forward and rear sectors 16 and 18 is required to resolve the sign of direction of target motion relative to the radar vehicle motion. For example (see FIG. 2), a positive range rate target reported from the rear zone represents a target car 26 going in the negative X direction while a positive range rate target reported from the forward zone represents a target car 26 going in the positive X direction. The side zone radar computes $V_{tgtx}$ from a series of range and range rate measurements on the target. $V_{tgtx}$ is the x-directed target velocity relative to the side zone car or platform x-directed velocity $V_{px}$.

The rear zones and forward zones 16 and 18 may be broken into 1 or more sectors according to system coverage performance requirements. However, to cover a full 180° of azimuth along a side of the radar vehicle 12, at least two sectors in the forward zone 16 and two sectors in the rear zone 18 must be implemented. The azimuth resolution required by the side zone automotive radar must be no more coarse than 45°. Wider beamwidth antennas may not be used because a crude estimate of target azimuth is needed by the velocity estimator 32 to allow the system to make a classification decision in a short amount of time after the target 26 is first detected. Using 45 degree beamwidth antennas, the side zone radar, using the velocity estimator 32 described below, makes a classification decision within 1/10 second. Antennas with 90 degree beamwidths could be used in the side zone radar, but the target x-velocity could not be accurately estimated until the target 26 was observed for longer than 1/10 second.

The low resolution antennas 28 may be realized in a great many ways. In the side zone radar, microstrip patch radiators are used to accomplish a flush mount capability.

Figure 5:
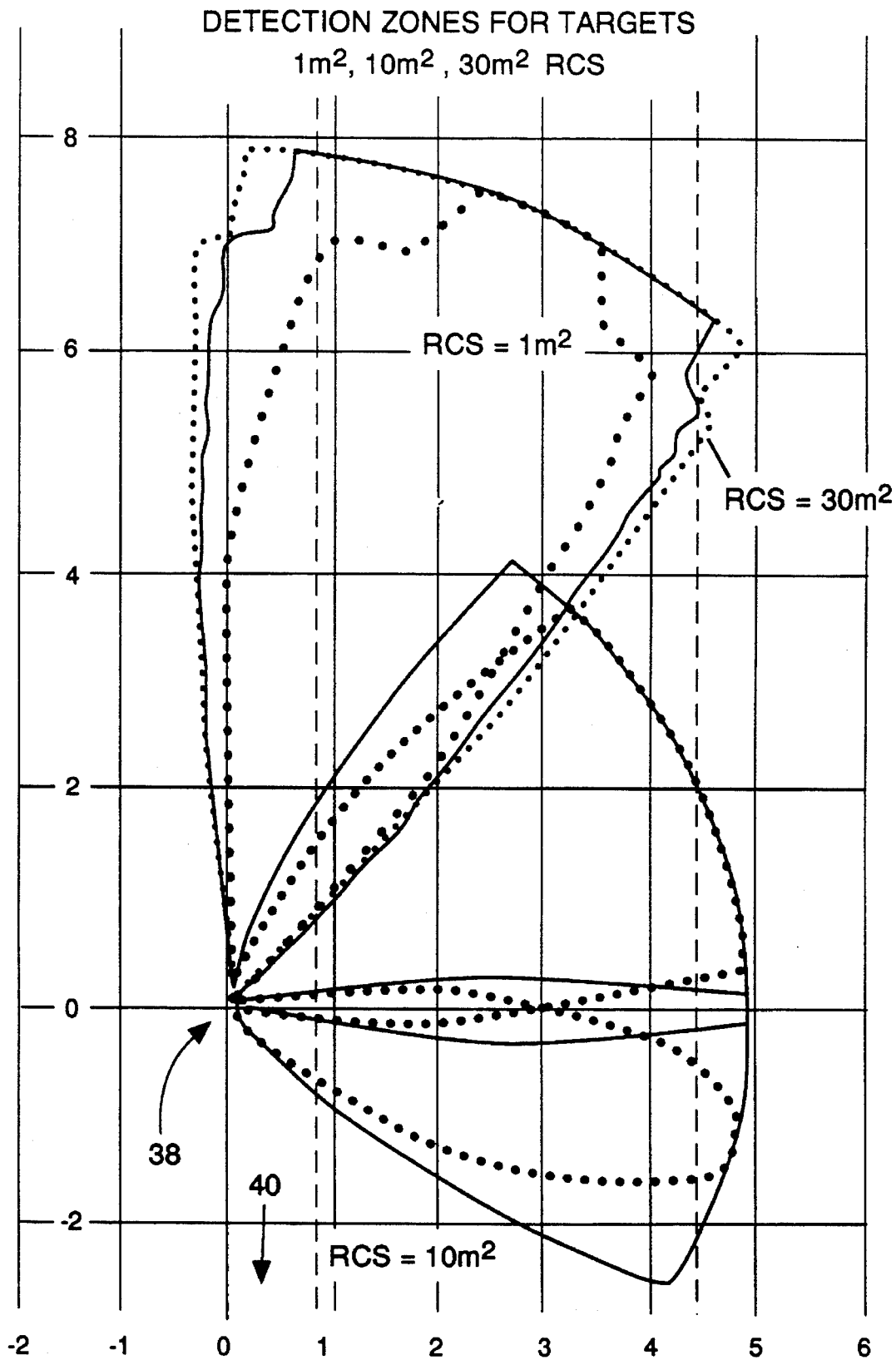
FIG. 5 is a graph illustrating basic target detection patterns for targets having different reflective properties using antennas with large beam widths.

In FIG. 5, basic target detection patterns are shown for targets which have differing reflective properties (RCS, i.e. Radar Cross Section) using antennas with large beamwidths. A radar location is indicated at the origin at 38 and platform motion is indicated by arrow 40. These patterns are the areas of coverage, i.e. areas where a target object 26 will be detected, of one version of the side zone radar. The design here does not call for full 180° azimuth coverage, hence only three detection sectors are used.

The ability to use the "low resolution" antennas 28, i.e. antennas with azimuth beamwidths of up to 45 degrees, provides for small size antennas, cost savings, and mounting flexibility. The use of high resolution antennas (azimuth beamwidths on the order of 5 degrees) would provide directly measured azimuth data on the target at a high cost. The high cost of using high resolution antennas is associated with the need to cover large azimuth sectors with narrow beamwidths, requiring the antenna to be scanned, or requiring a multiplicity of antennas (and attendant microwave transceiver channels) all pointing in slightly different directions.

Sensor With Range and Range Rate Information

Figure 3A:
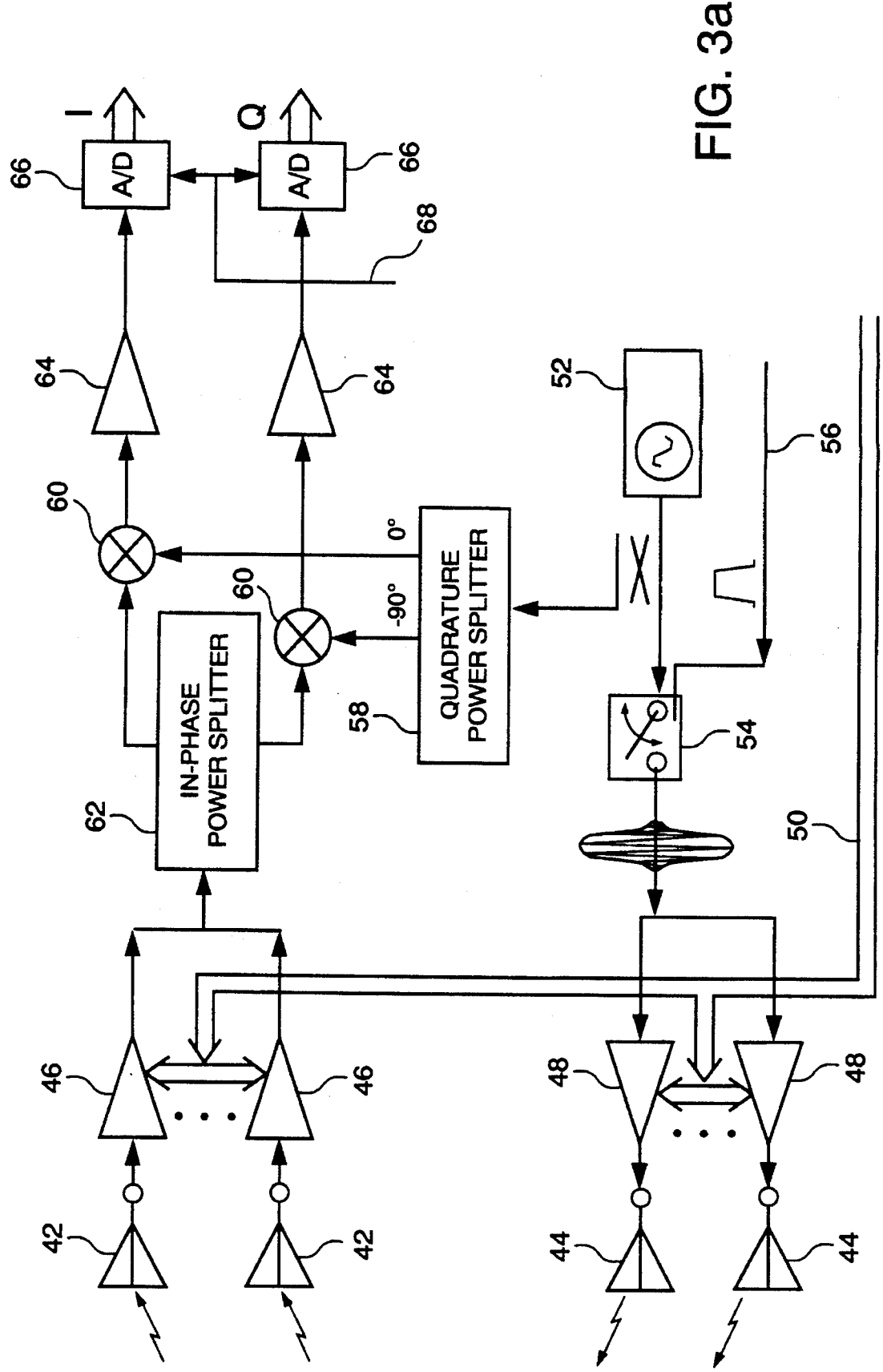
FIGS. 3a and 3b are schematic block diagrams of a pulse doppler radar sensor of the system of the present invention and illustrating multichannel microwave circuitry and signal processing, respectively.
Figure 3B:
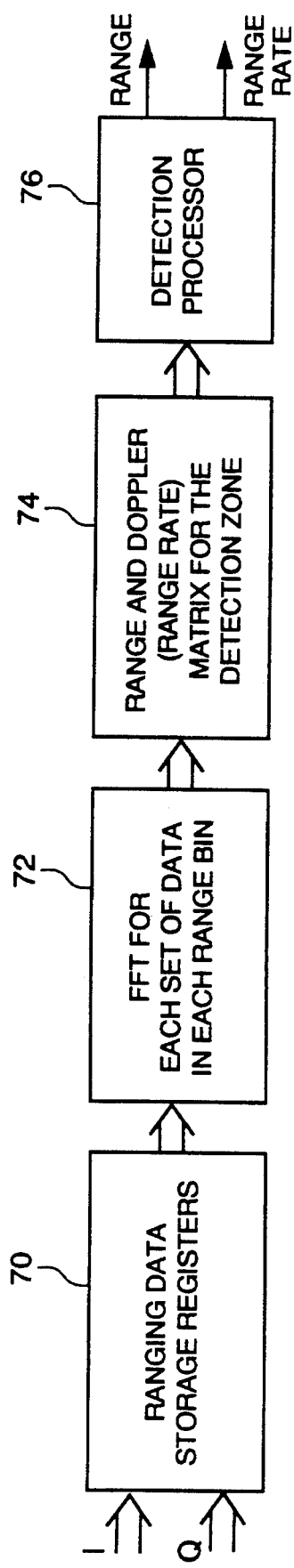

Unambiguous and accurate range and range rate data must be provided by the microwave sensor 30. Because the system uses wide beamwidth (low resolution) antennas 28 which collect data from a wide azimuth angle sector, the target azimuth angle is not precisely known from the sensor data. Consequently, the target's azimuth angle (hence position and velocity) must be estimated by the velocity estimator 32 to accomplish discrimination. By analyzing a series of target range and range rate measurements over time (i.e. the target range-doppler trajectory), the velocity estimator 32 computes target position and velocity. Since one set of data (azimuth and x-velocity) is estimated from a series of measured data (range and range rate), the measured data must be relatively accurate and strictly unambiguous for the velocity estimator to function properly. The range and range rate data is "unambiguous" by virtue of the fact that one target parameter measurement (say range) will not be influenced by the other target characteristic, range rate in this case. The side zone radar uses a pulse doppler radar sensor 30, block diagrams of which are shown in FIGS. 3a and 3b. FIG. 3a illustrates an example of multichannel circuitry including receive antennas 42, transmit antennas 44, receive amplifiers 46, and power amplifiers 48 controlled by signals appearing on a channel select control bus 50. A local oscillator 52 is coupled to a switch 54 which is controlled by a pulse control signal on line 56 to provide a short duration pulse microwave signal to the amplifiers 48.

The local oscillator 52 is also coupled to a quadrature power splitter 58 which, in turn, provides signals to mixers 60. The mixers 60 also receive signals from an in-phase power splitter 62 which is coupled to the receiver amplifiers 46. The signals from the mixers 60 are coupled-to video amplifiers 64 which, in turn, provide the amplified signals to A/D converters 66. The A/D converters 66 provide digital data upon receiving a sampling strobe signal on line 68.

FIG. 3b shows signal processing blocks for doppler data extraction. In general, during detection of the raw range and doppler information, a list of target reports is made. Each report has the target range and range rate parameters in it.

As illustrated at block 70 in FIG. 3b, the digital data is stored in storage registers.

At block 72, an FFT is performed for each set of data in each range bin.

At block 74, a range and doppler matrix for the detection zone is set up.

Finally, at block 76, a detection processor provides range and range rate data.

To cover multiple zones of detection as described above, a multiplicity of transceiver channels connected to different sets of antennas are required, or it is required that the transceiver channels are switched between different sets of antennas, or it is required that the antennas are mechanically or electrically scanned. In the side zone radar, various detection zones are covered using a separate transceiver channel with individual receive and transmit antennas for each zone. The signals are ultimately multiplexed by switching ON and OFF the attendant microwave receiver and transmitter amplifiers.

The data provided by the sensor 30 must be unambiguous over a limited range of target characteristics. If the target is moving so quickly as to create doppler shifts which fall outside the radar's unambiguous doppler coverage, the estimation process must be designed to handle this case. Currently, the side zone radar unambiguous doppler coverage is set for ±5 Khz, representing ±30 meters per second (m/s) range rate. The unambiguous doppler coverage of the side zone radar may be expanded at additional cost, however, infinite unambiguous doppler coverage may not be achieved.

If a hazardous target 26 overtakes the radar vehicle 12 (or vice versa) at a rate higher than 30 m/s (60 mph), an alarm may not occur. This is expected to be a rare case, and the event happens so quickly that the alarm is of little value. Oncoming traffic (non-hazardous targets) will commonly engage the radar vehicle with negative doppler signals which are larger in magnitude than 5 Khz, thus falling outside the sensor's unambiguous doppler coverage. The velocity estimator 32 must be designed to not alarm in this case.

Presence Of An Estimation Process Operating On A History Of Target Data (Velocity Estimator)

It is important that a history of range/range rate data sets provided by the sensor 30 be interpreted by an estimation process in order to discriminate between hazardous and non-hazardous targets. The side zone radar design requires an estimation process which computes the target's relative velocity with respect to the radar in the direction of motion of the radar vehicle 12. The estimation process must compute said target velocity from streams of range and range rate data provided by the sensor 30.

The velocity estimator 32 in the side zone radar is also a tracking filter, which enhances detection and false alarm rate performance. In order for a target to be reported (alarm generated), there must be a sequence of at least three range-doppler measurements which fall on an expected target range doppler trajectory. The target position and velocity trajectory is estimated by the first target measurement, then refined and updated as subsequent measurements are made. In this way, a filtered target measurement is accomplished while developing a target position/velocity history (i.e. a target "track").

In order to associate the numerous target reports with the appropriate trajectory predictions, a predict measurement window is computed after each measurement from the estimated target position and speed. If a measurement falls within the predict window on the next measurement cycle, that measurement is allocated to a track, the track is updated using the measurement data, and the next measurement is predicted.

Oncoming traffic type targets, when outside the unambiguous doppler coverage of the sensor 30, will have their second measurement fall outside the predicted range-doppler measurement window, thus a track will never develop. Since the track for high speed oncoming targets never gets a sequence of three associated measurements, the track is deleted, and no alarm occurs.

Alarm Criteria Definition

An alarm criteria which delineates between hazardous and non-hazardous targets must be provided. The side zone radar uses the criteria of comparing the target's relative velocity in the direction of the radar vehicle motion with the radar vehicle velocity as discussed above. The radar vehicle speed must be provided to the velocity comparison process in order to computer the target's x-directed velocity with respect to the ground, hence classify the target. There is described below in detail the algorithm used in the side zone radar for comparing platform and target x-directed velocities.

Return Power Desensitization of the Region Near the "Zero Doppler Line"

In addition to segregation between rear and forward detection zones 18 and 16, respectively, the system must have reduced detection sensitivity to objects in the region near the zero doppler line 20 (defined above and shown as the "y" axis in FIG. 1). The necessity of reduced detection sensitivity for targets near the zero doppler line 20 is brought about by the need to reject geometrically distributed non-hazardous targets such as guard rails. The required reduced sensitivity in the side zone radar is accomplished in two ways: 1) by the shape of the transceiver antenna power patterns in the azimuth direction, and 2) by selectively applying a higher detection threshold to target returns whose doppler parameter is zero or near zero.

Estimation Method

The objective of the processes described herein is to estimate the x-directed velocity of a radar target by interpreting time series of radar data vectors which have been selected to "belong to" said radar target. There are four distinct processes described below; grouped together they constitute the "tracking/estimator" algorithm. Three of these processes: predictor, estimator and initialization, constitute an "Extended non-linear Kalman Filter" algorithm. These algorithms work interactively with the Data Association algorithm to sort incoming data (from Ghost Target processing) into sets which are associated with existing track data, and other sets which will initialize new tracks.

Functional Description

The radar target of interest as measured by the vehicle radar sensor is modeled as a "system" which Dan be characterized by a set of state variables. These variables are based on physical equations of motion where the "system" (target) model is by no means unique. The system model must be adequate to serve the application. The estimator infers the values of certain target state variables, even though the microwave sensor assembly measures only non-linear combinations of these variables. The measurement and state vectors are:

$$\vec{z} = \begin{bmatrix} r \\ \dot{r} \end{bmatrix} \quad \vec{x} = \begin{bmatrix} \dot{x} \\ x \\ y \end{bmatrix} = \begin{bmatrix} x_1 \\ x_2 \\ x_3 \end{bmatrix} \quad (1)$$

where r and dr/dt are the variables which the radar measures (range and range rate), $x_1$, $x_2$, and $x_3$ are the state variables which model the state (x-velocity and position) of the target. The tracking/estimator computes the target state from time series of target measurements.

The target state equations of motion are:

$$\dot{\vec{x}} = [F] \cdot \vec{x} \quad (2)$$

where F is the state differential equation matrix and is:

$$[F] = \begin{bmatrix} 0 & 0 & 0 \\ 1 & 0 & 0 \\ 0 & 0 & 0 \end{bmatrix} \quad (3)$$

The system measurement equation is:

$$\vec{z} = h(\vec{x}) + \vec{v} = \begin{bmatrix} \sqrt{x_2^2 + x_3^2} \\ x_1 x_2 \\ \sqrt{x_2^2 + x_3^2} \end{bmatrix} + \vec{v} \quad (4)$$

where $h(\vec{x})$ is a non-linear vector function of a vector and $\vec{v}$ is a normal random variable vector with covariance R which characterizes the noise accompanying the measurement.

In order to infer the state of the target from the measurements, a state estimate is initialized after the first measurement and updated after every ensuing measurement. As the sequence of measurements becomes longer, the estimated state vector becomes closer to the actual state vector of the target. There are a number of variables involved, but there are two which must be computed just prior to and just after a measurement. These are the state vector estimate and the state error covariance matrix P. The following symbols are defined:

$\vec{x}_k(+)$=the state vector estimate after a measurement at time t=k;

$\vec{x}_k(-)$=the state vector estimate prior to a measurement at time t=k;

$P_k(-)$=the error covariance matrix just prior to a measurement at time t=k;

$P_k(+)$=the error covariance matrix just after a measurement at time t=k.

Algorithm Operation

The tracking/estimator operates by computing an initial estimate from the first measurement point via the initialization routine which is $x_0(+)$. At this point, "the track has been initialized". Upon the next measurement, $x_1(-)$ is computed by the predictor, then $x_1(+)$ is computed by the estimator. A "track file" is retained in memory which consists of the variables described above, with two additional variables:

tolm—the time of the last measurement, and;

count—the number of input data (measurements) which have been associated with the track, and processed by the estimator.

The predictor/estimator processes are repeated for every subsequent measurement until there are too many "missed" consecutive measurements, at which point the variables defined above are deleted from memory, i.e. "the track is deleted". Both the state vector x and the error covariance P must be updated by the predictor and the estimator.

Algorithm Subroutine Definitions

Predictor: uses currently existing state estimate as determined after a measurement at time k to compute the state vector estimate and covariance matrix just prior to a measurement at time k+1. Because of the nature of the data association algorithm, only parts of the general predictor algorithm are executed at any particular time, thus the general predictor will be broken down into two subroutines:

predictor_1:

$$\hat{\vec{x}}_k(-) = \Phi \hat{\vec{x}}_{k-1}(+) = \begin{bmatrix} 1 & 0 & 0 \\ \Delta t & 1 & 0 \\ 0 & 0 & 1 \end{bmatrix} \begin{bmatrix} \hat{x}_{1k-1}(+) \\ \hat{x}_{2k-1}(+) \\ \hat{x}_{3k-1}(+) \end{bmatrix}$$

$$= \begin{bmatrix} \hat{x}_{1k-1}(+) \\ \Delta t \hat{x}_{1k-1}(+) + \hat{x}_{2k-1}(+) \\ \hat{x}_{3k-1}(+) \end{bmatrix}$$

$$\vec{z}_p = h(\hat{\vec{x}}_k(-)) \quad (5b)$$

$\Delta t$ = time difference between the current and previous measurement
= time − tolm.

predictor_2:

$$P_k(-) = \Phi P_{k-1}(+) \Phi^T \quad (6)$$

| Input Data | |
|---|---|
| time: | real number which is part of the input data vector and is the time of measurement of said vector. |
| Data Source: | Ghost target output data via Data Association. |
| tolm: | real number which is part of the input data vector and is the time of measurement of the previous data. |
| Data Source: | track_file via Data Association. |
| $x_{k-1}(+)$: | current state estimate vector as updated by the estimator at the previous measurement time. |
| Data Source: | track_file via Data Association. |
| $P_{k-1}(+)$: | current value of the state estimate error covariance matrix as updated by the estimator at the previous measurement time. |
| Data Source: | track_file via Data Association. |
| Output Data | |
| $x_k(-)$: | predicted value of the state vector at the current measurement time. |
| Data Destination: | track_file via Data Association. |
| $P_k(-)$: | predicted value of the error covariance matrix at the current measurement time. |
| Data Destination: | track_file via Data Association. |
| $z_p$: | predicted measurement vector [r, dr/dt] as computed from the predicted state vector. |
| Data Destination: | Data Association. |
| Estimator: | uses the time updated state estimate and covariance matrix to compute a new state estimate and covariance matrix as influenced by the most recent measurement. |

$$\hat{\vec{x}}_k(+) = \hat{\vec{x}}_k(-) + K_k[\vec{Z}_k - h_k(\hat{\vec{x}}_k(-))] \quad (7)$$

where $$K_k = P_k(-)H_k^T[H_k P_k(-)H_k^T + R_k]^{-1} \quad (8)$$

The covariance matrix update is $$P_k(+) = [I - K_k H_k] P_k(-) \quad (9)$$

The h function matrix is defined in Equation (4); its argument for the estimate update, Equation (7), is the predictor estimate as given by Equation (5) from the previous measurement. The H matrix which is needed for Equations (8) and (9) is a function matrix with an argument explicitly:

$$H_k = H(\hat{x}_k(-)) \quad (10)$$

This function is defined as:

$$H(\hat{x}) = \begin{bmatrix} 0 & \frac{x_2}{\sqrt{x_2^2 + x_3^2}} & \frac{x_3}{\sqrt{x_2^2 + x_3^2}} \\ \frac{x_2}{\sqrt{(x_2^2 + x_3^2)}} & \frac{x_1}{\sqrt{x_2^2 + x_3^2}} \left(1 - \frac{x_2^2}{x_2^2 + x_3^2}\right) & \frac{-x_1 x_2 x_3}{\sqrt{x_2^2 + x_3^2} \; (x_2^2 + x_3^2)} \end{bmatrix} \quad (11)$$

Whenever this function is evaluated, its argument is the state estimate as computed by the predictor.

Input Data

| | |
|---|---|
| $x_k(-)$: | predicted value of the state vector at the current measurement time. |
| Data Source: | track_file via Data Association. |
| $P_k(-)$: | predicted value of the error covariance matrix at the current measurement time. |
| Data Source: | track_file via Data Association. |
| R: | measurement noise covariance matrix (2 × 2). A diagonal matrix thus only $r_{11}$ and $r_{22}$ need be stored - real numbers. |
| Data Source: | System memory. |
| $z_k$: | input measurement vector. |
| Data Source: | Data Association. |

Output Data

| | |
|---|---|
| $x_k(+)$: | current state estimate vector. |
| Data Destination: | track_file via Data Association. |
| $P_k(+)$ | current value of the state estimate error covariance matrix. |
| Data Destination: | track_file via Data Association. |
| Initialization: | uses "first" measurement data point to estimate the state vector according to the zone, range, and range rate which originates the first measurement. |

Input Data

| | |
|---|---|
| $z_k$: | input vector [r, dr/dt, zone] =[$z_{k1}$, $z_{k2}$, $z_{k3}$] |
| Data Source: | Data Association |
| rlimit: | real number to be compared to the measured range ($z_{k1}$), |
| Data Source: | System memory |
| yeo: | real number which is used as the initial y estimate under certain circumstances, |
| Data Source: | System memory |
| fx: | real number, |
| Data Source: | System memory |
| fy: | real number, |
| Data Source: | System memory |
| fxdot: | real number |
| Data Source: | System memory |
| cx: | real number, |
| Data Source: | System memory |
| cy: | real number, |
| Data Source: | System memory |
| cxdot: | real number, |
| Data Source: | System memory |
| cx_2: | real number, |
| Data Source: | System memory |
| cy_2: | real number, |
| Data Source: | System memory |
| cxdot_2 | real number, |
| Data Source: | System memory |
| rxdot_1: | real number, |
| Data Source: | System memory |
| rxdot_2: | real number, |
| Data Source: | System memory |
| rx: | real number, |
| Data Source: | System memory |
| ry: | real number, |

-continued

| | |
|---|---|
| Data Source: | System memory |

Output Data

| | |
|---|---|
| $x_k(+)$: | output initial state estimate [x_dot$_{est}$, $x_{est}$, $y_{est}$] |
| Data Destination: | Data Association |

Processing:

If $z_{k3}$ = "forward" then
    $x_{est}$ = fx $z_{k1}$
    $y_{est}$ = fy $z_{k1}$
    x_dot$_{est}$ = fxdot $z_{k2}$.
If $z_{k3}$ = "center" then
If $z_{k2}$ <= 0 then
    $x_{est}$ = cx $z_{k1}$
    $y_{est}$ = cy $z_{k1}$
    x_dot$_{est}$ = cxdot $z_{k2}$,
  else ($z_{k2}$ > 0)
    $x_{est}$ = cx_2 $z_{k1}$
    $y_{est}$ = cy_2 $z_{k1}$
    x_dot$_{est}$ = cxdot_2 $z_{k2}$.
If $z_{k3}$ = "rear" then
If $z_{k1}$ > rlimit then
    x_dot$_{est}$ + rxdot_1 $z_{k2}$
    $y_{est}$ = yeo
    $x_{est}$ = −Sqrt [$z_{k1}^2$ − $y_{est}^2$]
  else
    x_dot$_{est}$ = rxdot_2 $z_{k2}$
    $x_{est}$ = rx $z_{k1}$
    $y_{est}$ = ry $z_{k1}$.

| | |
|---|---|
| Data Association: | This routine organizes the operation of the subroutines described above. It makes decisions about which incoming data are to be associated with existing trackfiles. It creates trackfiles, maintains (updates) the trackfile data, and deletes trackfiles. |

Input Data

| | |
|---|---|
| submissions: | groups of target reports, each report is a four element vector: (range (real), range_rate (real), time (real), zone (index)] |
| Data Source: | Ghost Target processor |
| rtolerp: | real number - the size of the difference between a predicted range and measured range is tested against this number for decision making |
| Data Source: | System memory |
| rdottolerp: | real number - the size of the difference between a predicted range rate and measured range rate is tested against this |

| Data Source: | number for decision making System memory |
| --- | --- |
| nrprts: | integer number - the maximum number of reports processed by the tracking estimator which are counted |
| Data Source: maxtracks: | System memory integer number - the maximum number of trackfiles which will be maintained and processed by the system |
| Data Source: mssdrprts: | System memory integer number - the number of consecutive missed reports required to delete a trackfile. |
| Data Source: deltatmax: | System memory real number, units of msec - the maximum allowable time between consecutive reports associated with a particular track which will preserve the track |
| Data Source: p11, p22, p33: | System memory The diagonal elements of the $P_0$ matrix, all other elements are zero, used for initializing a track, real numbers |
| Data Source: Output Data | System memory |
| track_files: | a set of data groups (each group being a track_file) which retain the "memory" of the Kalman filter processes currently running. Each track_file contains the current target state estimate and covariance matrix: $x_k$ (+), $P_k$ (+), the current number of associated reports processed by the estimator/predictor/initialization, designated count, and the time of last measurement, tolm. count takes on values between 0 and nrprts. |

Processing

Data association is a group of sorting and testing routines. It accomplishes its objective of getting he right data to the right processes by operating predictor_1 and performing comparisons between the predictor output and the incoming data. Depending on the outcome, either the estimator or the initialization are called to process the input (radar measurement) data. An internal variable: "numbr_of_tracks" keeps count of the number of currently active tracks, and is set to 0 upon radar initialization (@ power up).

For each track_file$_i$, a list of data which belongs to the track is built, referred to as "input$_i$". The following is performed in the given sequence:

0) Initialize the routine by creating a temporary variable tmax = 0, and setting all the input$_i$ to NULL.
1) For each existing track_file "i", compare all the input data reports "j" (i.e. each member of submissions) to test for the attribute of submission$_j$ "belonging" to track$_i$.
   1a) read $z_k$ = [range, range_dot] and time from submission$_j$ and tolm from track_file$_i$, compute time - tolm = dt, if time > tmax, then tmax = time,
   1b) execute predictor_1 (dt), returning $z_p$ and $x_k$ (-),
   1c) compute $1z_k - z_p1 = z_{diff}$,
   1d) if $z_{diff}$ [1] < rtolerp and $z_{diff}$ [2] < rdot1erp -- create the data set [$z_k$, $x_k$ (-), dt, $z_{diff}$, time] and append this to input$_i$ (the data list associated with track_file$_i$), -- mark submission$_j$ as having been associated.
2) For each input$_i$ with one or more data sets, select the set with the smallest l$z_{diff}$l, then execute predictor_2 using $P_{k-1}$ (+) from track_file$_i$, dt from input$_i$, and update the track_file$_i$ with the new $P_k$ (-) and $x_k$ (-).
3) For each track_file$_i$:
   If input$_i$ not equal to NULL,
      execute the estimator, increment the track_file$_i$ count by 1 if the count is less than nrprts, replace track_file$_i$ tolm with time, and update the trackfile data with the estimator outputs $x_k$ (+) and $P_k$ (+).
   If input$_i$ equals NULL,
      If track_file$_i$ count > 1,
         decrement the track_file$_i$ count by 1
      else do not decrement the track_file$_i$ count
      If tmax - tolm > deltatmax
         delete the trackfile and decrement numbr_of_tracks by one
      else do not delete the trackfile.
4) For all submissions which were not associated with any of the track_files, order the group according to the following priorities:
      rear zone r_dot < 0
         highest lr_dotl
      center zone r_dot < 0
         highest lr_dotl
      forward zone r_dot < 0
         highest lr_dotl
      center zone r_dot > 0
         lowest lr_dotl
      forward zone r_dot > 0
         lowest lr_dotl
      rear zone r_dot > 0
         lowest lr_dotl
      call initialization and increment num_of_tracks by 1 for each of the ordered submissions$_j$ until num_of_tracks = maxtracks. Form a track_file with the initialization output for $x_k$ (+), $P_0$ for $P_k$ (+), dummy values for $x_k$ (-) and $P_k$ (-), time for tolm, set count to 1.
      delete all remaining submissions End of Data Association Computational Notes The state estimate time update equation (5) can be computed by updating only the estimated x position of the target ($x_2$); both the y estimate ($x_3$) and the dx/dt estimate ($x_1$) remain unchanged for a time update.

The state error covariance matrix P is a symmetrical matrix in every case. Therefore, only six of the nine elements must be explicitly calculated.

The measurement noise covariance matrix R is a diagonal matrix which saves computations. Since R is a 2×2, the matrix inversion size is 2×2.

Discrimination Method

The discrimination algorithm compares the speed of the side zone radar vehicle (platform) with the various available target x-directed velocities as given by the Tracking/Estimator trackfiles. The first element of each existing trackfile is the target state estimate: [x_dot, x, y] . Each x_dot is compared with the radar vehicle speed to make an alarm decision.

| Input Data | |
| --- | --- |
| vpx: | SDS vehicle platform speed |
| Data Source: | System Control Module |
| vpxo: | real number |
| Data Source: | System Memory |
| m: | real number |
| Data Source: | System Memory |
| b: | real number |
| Data Source: | System Memory |
| x_dot: | set of x_dot components of the various track_file data |

-continued

| | |
|---|---|
| Data Source: | track_files via Data Association |
| count: | set of count components of the various track_file data |
| Data Source: | track_files via Data Association |
| nrprts: | integer number - the maximum number of reports processed by the tracking/estimator which are counted |
| Data Source: | System Memory |
| mssdrprts: | integer number - the number of consecutive missed reports required to delete a track_file |
| Data Source: | System Memory |
| Output Data | |
| alarm: | Logical signal level indicating whether or not to indicate a target in the system display |
| Data Destination: | System Output |
| Processing | |

```
        Process all of the available track_files data
in the following way:
    For vpx >= vpxo,
        If any of the x_dot are such that:
            x_dot > -vpx + m (vpx - vpxo) + b
    AND
            count > nrprts - mssdrprts
    set alarm = TRUE
    ELSE
    set alarm = FALSE.
    For vpx < vpxo,
        If any of the x_dot are such that:
            x_dot > -vpx + b
    AND
            count > nrprts - mssdrprts
    set alarm = TRUE
    ELSE
    set alarm = FALSE.
    end.
```

While the best mode for carrying out the invention has been described in detail, those familiar with the art to which this invention relates will recognize various alternative designs and embodiments for practicing the invention as defined by the following claims.

What is claimed is:

1. In a road vehicle radar system capable of detecting the presence of one or more targets in proximity to a vehicle moving at a velocity in a first lane of traffic, a method for discriminating a target which presents a hazard to the vehicle from a target which does not present a hazard to the vehicle, the method comprising:

producing a radar beam having a sufficient beamwidth to illuminate a target in a second lane which is adjacent to the first lane, at least a portion of the radar beam being produced along a first axis which is perpendicular to the direction of motion of the vehicle;

receiving a reflected signal from the illuminated target;

estimating a velocity of the illuminated target, relative to the velocity of the vehicle, in the direction of a second axis which is parallel to the direction of motion of the vehicle based on the reflected signal;

measuring the velocity of the vehicle using at least one velocity sensor;

determining that the illuminated target is hazardous if the sum of the measured vehicle velocity and the estimated parallel target velocity is greater than a first predetermined threshold; and determining that the illuminated target is not hazardous if the sum of the measured vehicle velocity and the estimated parallel target velocity is less than a second predetermined threshold.

2. The method of claim 1 wherein the beamwidth of the radar beam is greater than 5–10 degrees.

3. The method of claim 1 wherein the vehicle has a front, a back and two sides and wherein the step of producing a radar beam uses a radar antenna which is mounted flush to at least one of the two sides of the vehicle.

4. The method of claim 1 wherein the step of estimating includes using a Kalman filter.

5. The method of claim 4 wherein the Kalman filter is an extended nonlinear Kalman filter.

6. The method of claim 5 wherein the Kalman filter includes the step of calculating an initial estimate for one or more state variables which describe the motion of the target at a time t0, based on a measured value from the received signal at time t0.

7. The method of claim 6 wherein the Kalman filter further includes predicting a value for the one or more states at a time tn+1, based on an estimate for the one or more state variables at a previous time tn, wherein the estimate for the one or more state variables at time tn is calculated from a measured value from the received signal at time tn and from a prediction of a value of the one or more states at time tn.

8. The method of claim 1 further comprising the step of generating an alarm signal if the target is determined to be hazardous.

9. The method of claim 8 further comprising the step of providing an indication to the driver if the alarm signal is generated.

10. A road vehicle radar system for detecting the presence of one or more targets in proximity to a vehicle moving at a velocity in a first lane of traffic, and for discriminating a target which presents a hazard to the vehicle from a target which does not present a hazard to the vehicle, the system comprising:

a radar signal generator;

an antenna, coupled to the radar signal generator, for producing a radar beam having a sufficient beamwidth to illuminate a target in a second lane which is adjacent to the first lane, at least a portion of the radar beam being produced along a first axis which is perpendicular to the direction of motion of the vehicle;

a receiver, coupled to the antenna, for receiving a reflected signal from the illuminated target;

estimating means for estimating the velocity of the illuminated target in the direction of a second axis which is parallel to the direction of motion of the vehicle based on the reflected signal;

a sensor for measuring the velocity of the vehicle; and a comparator, coupled to the estimating means and the sensor, for determining that the illuminated target is hazardous if the sum of the measured vehicle velocity and the estimated parallel target velocity is greater than a first predetermined threshold and for determining that the illuminated target is not hazardous if the sum of the measured vehicle velocity and the estimated parallel target velocity is less than a second predetermined threshold.

11. The system of claim 10 wherein the beamwidth of the radar beam is greater than 5–10 degrees.

12. The system of claim 10 wherein the vehicle has a front, a back and two sides and wherein the antenna is mounted flush to at least one of the two sides of the vehicle.

13. The system of claim 10 wherein the estimating means includes a Kalman filter.

14. The system of claim 13 wherein the Kalman filter is an extended nonlinear Kalman filter.

15. The system of claim 14 wherein the Kalman filter includes means for calculating an initial estimate for one or more state variables which describe the motion of the target at a time t0, based on a measured value from the received signal at time t0.

16. The system of claim 15 wherein the Kalman filter further includes means for predicting a value for the one or more states at a time tn+1, based on an estimate for the one or more state variables at a previous time tn, wherein the estimate for the one or more state variables at time tn is calculated from a measured value from the received signal at time tn and from a prediction of a value of the one or more states at time tn.

17. The system of claim 10 further comprising means for generating an alarm signal if the target is determined to be hazardous.

18. The system of claim 17 further comprising means for providing an indication to the driver if the alarm signal is generated.

* * * * *